(12) United States Patent
Aramburo

(10) Patent No.: US 10,377,391 B2
(45) Date of Patent: Aug. 13, 2019

(54) WINCH FOR WATER SPORTS AND OTHER USES

(71) Applicant: Ernesto Aramburo, Allaman (CH)

(72) Inventor: Ernesto Aramburo, Allaman (CH)

( * ) Notice: Subject to any disclaimer, the term of this patent is extended or adjusted under 35 U.S.C. 154(b) by 39 days.

(21) Appl. No.: 15/317,417

(22) PCT Filed: Jun. 12, 2015

(86) PCT No.: PCT/IB2015/054467
§ 371 (c)(1),
(2) Date: Dec. 9, 2016

(87) PCT Pub. No.: WO2015/189820
PCT Pub. Date: Dec. 17, 2015

(65) Prior Publication Data
US 2017/0120934 A1    May 4, 2017

(30) Foreign Application Priority Data
Jun. 12, 2014 (CH) .......................... 886/14

(51) Int. Cl.
*B61B 11/00* (2006.01)
*A63C 11/10* (2006.01)
(Continued)

(52) U.S. Cl.
CPC .............. *B61B 11/00* (2013.01); *A63C 11/10* (2013.01); *B61B 11/002* (2013.01);
(Continued)

(58) Field of Classification Search
CPC ......... B63B 35/815; B61B 11/00; B66D 1/26; B66D 1/50
See application file for complete search history.

(56) References Cited

U.S. PATENT DOCUMENTS

| | | | | |
|---|---|---|---|---|
| 813,211 A | * | 2/1906 | Jacobs ..................... | B66D 1/26 242/156 |
| 1,744,970 A | * | 1/1930 | Kern ........................ | B66D 1/26 254/300 |

(Continued)

FOREIGN PATENT DOCUMENTS

| | | |
|---|---|---|
| DE | 1505992 A1 | 7/1970 |
| DE | 3930452 A1 | 3/1991 |

(Continued)

OTHER PUBLICATIONS

International Search Report of PCT/IB2015/054467 dated Sep. 9, 2015
(Continued)

*Primary Examiner* — Emmanuel M Marcelo
(74) *Attorney, Agent, or Firm* — Andre Roland S.A.; Nikolaus Schibli

(57) ABSTRACT

The invention relates to a winch system intended, in particular, for water sports, comprising at least one frame, at least one motor, a brake system, and a main tension cable wound around two spools, each spool being actuated by a motor such that when one of the spools unwinds the main cable, the other spool winds up the cable such as to maintain both the unwinding speed and the tension required for the main cable.

19 Claims, 5 Drawing Sheets

(51) Int. Cl.
*B63B 35/81* (2006.01)
*B66D 1/26* (2006.01)
*B66D 1/50* (2006.01)
*B66D 5/02* (2006.01)

(52) U.S. Cl.
CPC .............. *B63B 35/815* (2013.01); *B66D 1/26* (2013.01); *B66D 1/50* (2013.01); *B66D 5/02* (2013.01); *Y02T 30/30* (2013.01); *Y02T 30/40* (2013.01)

(56) References Cited

U.S. PATENT DOCUMENTS

| | | | | |
|---|---|---|---|---|
| 1,850,440 | A * | 3/1932 | Berger | B66D 1/26 254/297 |
| 3,003,585 | A * | 10/1961 | Andersson | B66D 1/26 187/257 |
| 3,052,470 | A | 9/1962 | Pomagalski | |
| 3,315,914 | A * | 4/1967 | Turner | B61B 12/10 242/390.1 |
| 3,368,498 | A | 2/1968 | Doveri | |
| 3,386,704 | A * | 6/1968 | Dawson | B66D 1/26 254/299 |
| 3,739,728 | A * | 6/1973 | Thompson | B61B 11/00 104/173.2 |
| 3,779,171 | A | 12/1973 | Littlehorn | |
| 3,787,031 | A * | 1/1974 | Lucas | B63B 27/18 104/114 |
| 3,874,303 | A * | 4/1975 | Andren | B61B 11/00 104/173.2 |
| 4,023,502 | A * | 5/1977 | Elsing | B61B 11/00 104/173.2 |
| 4,920,892 | A | 5/1990 | Pesek | |
| 4,986,141 | A * | 1/1991 | Meurer | B01D 21/04 74/89.22 |
| 5,046,704 | A * | 9/1991 | Liner | B66D 1/16 192/93 A |
| 5,205,219 | A * | 4/1993 | Groskreutz | B61B 11/002 104/173.2 |
| 5,678,805 | A * | 10/1997 | Moser | A63B 47/021 242/388.8 |
| 6,089,547 | A * | 7/2000 | Juelich | B66D 1/741 114/230.23 |
| 7,273,207 | B2 * | 9/2007 | Studer | B66D 1/14 254/278 |
| 7,543,798 | B2 * | 6/2009 | Cunningham | B66D 3/20 191/12.2 R |
| 8,220,405 | B2 * | 7/2012 | Christensen | B63B 35/816 114/254 |
| 8,657,261 | B2 | 2/2014 | Mehrkens | |
| 9,592,890 | B2 * | 3/2017 | Christensen | B63B 35/816 |

FOREIGN PATENT DOCUMENTS

| | | |
|---|---|---|
| FR | 2873084 A1 | 1/2006 |
| GB | 996666 A | 6/1965 |
| NZ | 521074 A | 2/2004 |
| WO | WO0156855 A1 | 8/2001 |

OTHER PUBLICATIONS

Written Opinion of the International Search Authority dated Sep. 9, 2015.
Swiss Assisted Search Report dated Jun. 3, 2014.

* cited by examiner

WINCH FOR WATER SPORTS AND OTHER USES

CROSS REFERENCE TO RELATED APPLICATIONS

The present application is a U.S. national stage application of PCT/IB2015/054467 filed on Jun. 12, 2015 designating the United States, and claims foreign priority to Swiss patent application CH 00886/14 filed on Jun. 12, 2014, the contents of both documents being herewith incorporated by reference in their entirety.

TECHNICAL FIELD

The present invention relates to the field of transportable winches, in particular the winches utilized in the water sports field, for example for pulling boards or water skis on a body of water.

In other applications, the winch according to the invention my serve for the transport of persons or miscellaneous goods under different conditions (rescue, removals, etc.).

An example of a winch is known from publication U.S. Pat. No. 8,657,261, which describes a mobile traction system for users of gliding means such as skis, a snow board or a skateboard and other similar devices.

SUMMARY OF THE INVENTION

The aim of the invention is to improve the known devices.

More specifically, one aim of the invention is to propose a transportable system which is simple and easy to utilize over variable distances for transporting loads or persons, in particular for participation in water sports or other sports.

The present invention is defined by the independent claims, and modes of implementation thereof are defined by the dependent claims.

DETAILED DESCRIPTION

Figure 1:
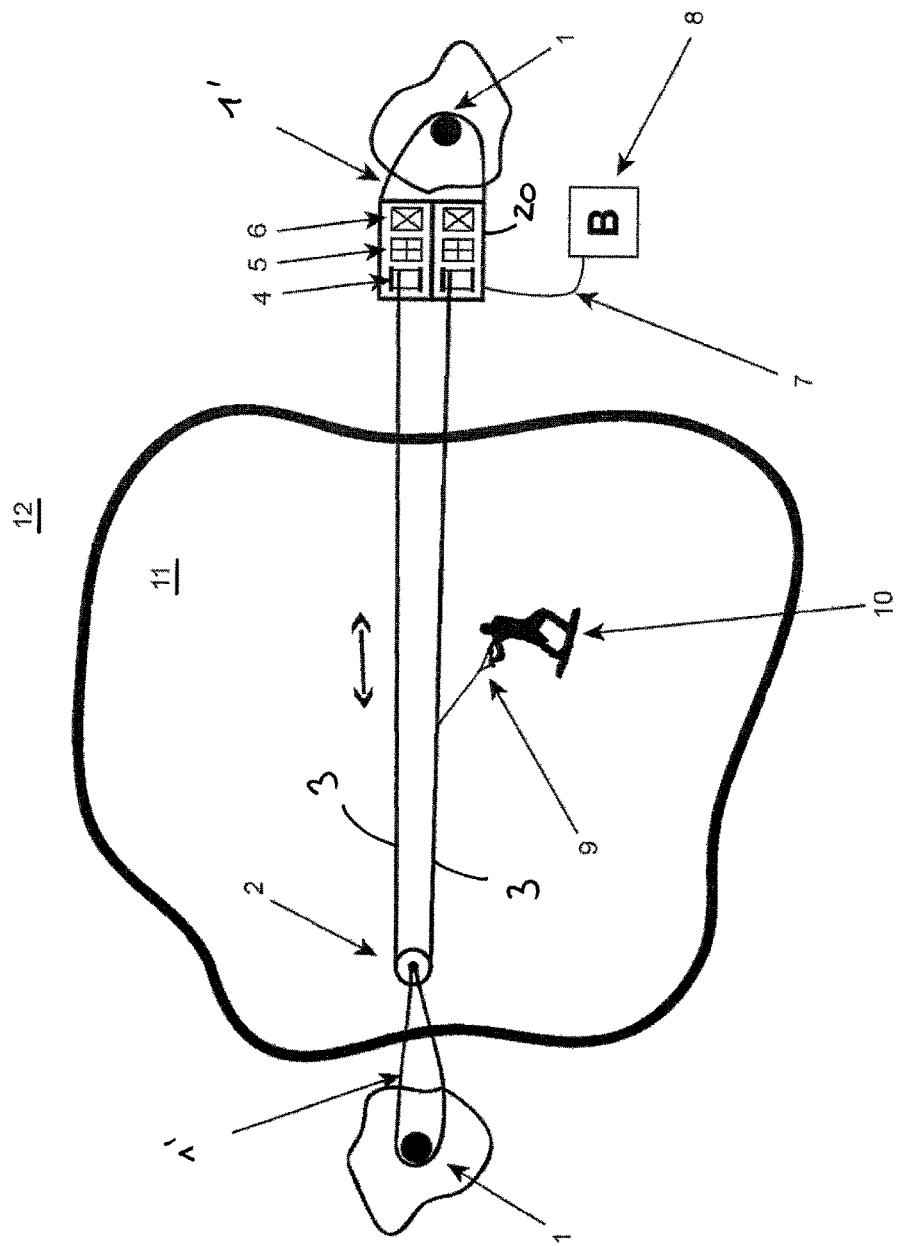
FIG. 1 is an illustration of a first mode of implementation of the present invention.

The device according to the invention allows a snow skier, a water skier or also an object to be towed along a traction segment 3 of variable length, which allows him to travel out and back on water 11, snow, ground 12 and even when suspended in the air. These outward and return movements may be performed at the desired speed and/or with the desired force.

A first mode of implementation is described with reference to FIG. 1. It comprises in particular fixed points 1, for example on the ground 12, a return pulley 2, two spools 4 actuated by a motor 5 and a rope forming a segment 3 to either side of the pulley 2, each segment 3 being wound onto a spool 4. The one or more motors are driven by an inverter or a controller 6. The user 10, being in this case a water skiing enthusiast, is towed over the body of water 11 by the segment 3.

The installation of the device according to the invention is very simple: the device (for example in the form of a frame 20 and comprising in particular the spools 4, the motor 5 and the controller 6), is strapped by means of a strap 1' or is anchored to a fixed point 1 (for example a tree or a mast or some other equivalent fixed point), and the return pulley 2 is attached in the same way to the other end of the segment 3, for example by utilizing a strap 1' attached to a fixed point 1. When setting up the pulley 2, the user 10 unwinds a rope from two spools 4, thereby creating a segment 3. Once this has been done, the device may pull the user 10 or an object along the segment 3 in both directions and with the same force. The user 10 himself may operate the speed and force of the device, if desired, by means of a remote control. The control may likewise (or alternatively) be performed from a fixed location, for example at one extremity of the segment 3, via a drive on the inverter or a controller 6 for the frame 20.

The device according to the invention makes it possible to keep away from any fixed installation, from any shoreline or from any contact with the ground in between the two anchoring points 1. It also permits the rapid deployment of the system and makes it easily transportable, for example in the trunk of an automobile or on a trailer. It makes it possible to apportion the cost of participating in these disciplines (skiing or water skiing), since only the energy for towing the user 10 or the object is generated. It makes it possible to participate alone, since the user 10 is able to operate the entire device. It makes it possible to adjust the speed (from 0 to tens of km/h) in order to make it suitable for all uses.

For water sports, this is the only device which makes it possible to have a variable length of rope (length of the segment 3), to keep away from shorelines and to participate alone and in silence.

If the device is utilized on inclined planes, it is possible initially to set up the pulley 2 on the elevated part of the plane, and then to request the device to wind up the rope (comprising the segments 3) simultaneously onto the two spools 4, which makes it possible (by the provision of wheels or runners underneath the frame 20) to mount the device comprising in particular the frame 20 with the spools 4, the motor 5 and the controller 6 along the slope, rather than being obliged to mount it manually or by other means.

For this purpose, the device according to the invention thus comprises in particular at least one motor 5 (preferably two motors), two winding spools 4, an energy supply system with a cable 7 and a power supply unit 8 and a main rope (comprising the two segments 3), as well as an additional small perpendicular rope 9.

It may or may not be utilized with a return pulley 2, as may be established from the different illustrated methods of implementation.

It also comprises a remote control which is wired or wireless.

The device is transportable (e.g. in the trunk of an automobile or by means of wheels and handles or in the manner of a wheelbarrow).

The device according to the invention has the following characterizing features and modes of implementation:

- possibility of deploying an outward and return segment 3 of variable length, which is not possible with the known devices having a loop of fixed length;
- no need to use a permanent installation, only two anchoring points being sufficient.

the system utilizes one or two motors 5. In the case of a single motor 5, this will drive one or other of the two winding-up spools 4, at the same time braking the spool that is not being driven (mechanical brake of the dynamo type or some other type, such as the regenerative braking of the electric motors).

The anchoring points 1 have a tension induced by the necessary force for towing the participant. No additional tension is necessary.

The device is controlled by the user, no operator being required. Alternatively, it is possible to resort to an operator, for example if the system is being utilized by a novice or as part of a display.

The user may adjust the speed and/or the force and has available an end-of-run function and a dead man function with which to bring the system to a stop automatically in an emergency or at the end of a run. The drive utilized by the participant communicates with the motors in a wired or wireless manner. It is watertight and resistant to impacts and dust, and it may be integrated into the handle which is present on the rope 9.

The system is silent when utilized with electric motors, although it may be utilized with other types of motor, for example internal combustion engines.

The system may be utilized with batteries 8 or with mains power as the source of energy, but also with solar panels or any other equivalent and appropriate source of electricity and/or energy.

The system may utilize a nylon, microfiber or other rope, or a metal rope (cable).

The system is modular, ensuring that any batteries 8 and the drive system may be transported separately by a number of persons, or by a single person.

The device comprises one or two motors 5. When two motors 5 are used, they communicate with one another in order for one of the two to drive (wind up) the rope, while the other brakes it in order to maintain a residual tension in the rope, thereby preventing it from touching the ground, the water or anything else. The motors 5 may thus play a double role: that of a drive and that of a brake.

When a single motor 5 is used, it will couple itself selectively to one spool or to the other depending on the direction of running. A mechanism of the mechanical brake, dynamo or regenerative braking type will brake the spool as it unwinds.

Figure 2:
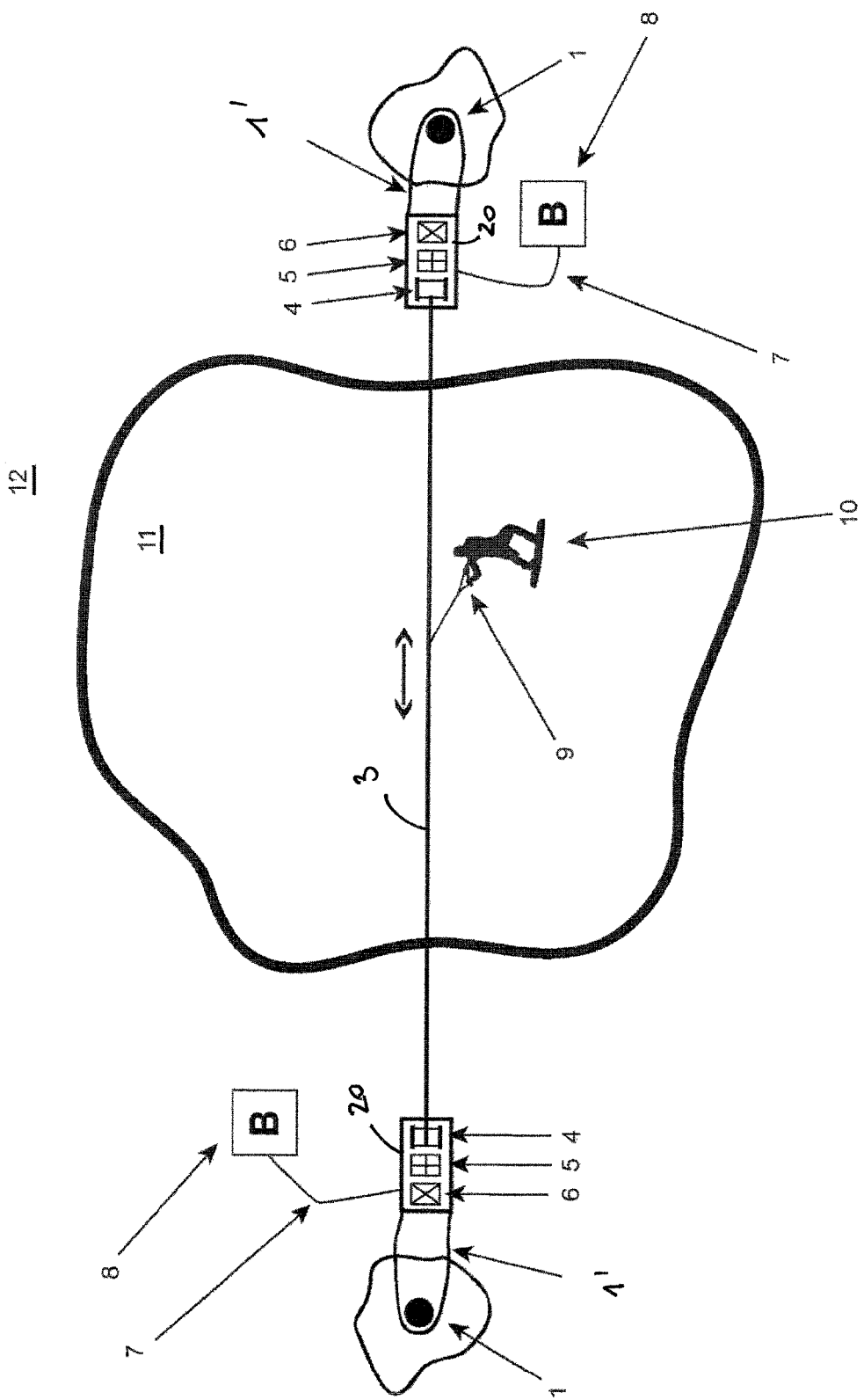
FIG. 2 is an illustration of a second mode of implementation of the present invention.

According to one mode of implementation, the motors 5 may each be present at one end of the segment 3, which eliminates the need for a pulley 2 at the end of the segment 3. At this moment, each motor 5 has its own energy supply (7,8) and is totally autonomous, albeit communicating with the other motor in order to coordinate their function. This mode of implementation is illustrated in FIG. 2, for example, in the application to water skiing. A traction system comprising a spool 4, a motor 5 and a controller 6, which are attached (for example via a strap 1') to a fixed point 1, can be found on each side of the body of water 11. Each traction system comprises its own power supply system 7, 8. Alternatively, it is also possible to utilize a common energy supply system or to utilize an energy supply system that is present on-site.

The system according to the invention comprises, for example, inverters 6 which drive the one or more motors 5. In the configuration with two motors 5, preferably two inverters 6 are present, and these inverters function as a single unit and talk to each other through an architecture of the master/slave type. Each of the motors 5 causes a winding spool 4 for the main traction rope to rotate. While one motor 5 winds up the rope, the other unwinds the rope permitting said rope, by means of a pulley, to form a loop. Typically, the length of the segments 3 is 50 m to 200 m in the majority of cases, but may be above or below this distance.

A small secondary rope 9 (about 10 m) is attached perpendicularly to this loop, present at the end of which rope is a handle which the user 10 holds on to. The drive 6 for the motors 5 may be integrated with the handle or may be a discrete element that is capable of being utilized by a person other than the user 10 of the system.

The whole is preferably mounted in a transportable frame 20, which makes the system easily movable, in particular in a trailer or in the trunk of a vehicle.

The system continuously checks the tension and speed of the main rope in order for it to have to supply only the force necessary for towing the sportsman, being only a few tens of kilos or more. This measurement may be made in the area of the spools 4, for example, by conventional means. If, when starting in open water, the user requires additional energy to be supplied to the machine in order to bring him out of the water, the machine will supply additional energy for the period necessary in order to reach the nominal speed. This is done by connecting the inputs and outputs of the two inverters which operate the electric motors (or drive them appropriate for the motors) or by coupling the motor and the brake. By coupling their inputs and their outputs, they transmit their state of speed and tension to each other in order to maintain the desired speed (about 8.5 m/s for utilization on water, for example) and to correct it as required.

When a motor 5 winds up it seeks to maintain a constant speed (8.5 m/s), whereas the motor 5 which unwinds seeks to maintain a constant tension (several kilos). This enables us to achieve an uninterrupted outward and return behavior of the sportsman without it being necessary to utilize a metal cable and tensions in the order of one tonne. The disadvantage of the approach by metal cable is that, in addition, it defines a fixed length of segment 3, whereas the device according to the invention can be deployed over any desired length. All that is required is to set the desired distance in the drives for the motors 5 with the spools 4, which is not possible with a fixed loop having a defined length.

In more simple terms, the familiar approach by cable involves an actual loop of fixed length, whereas the approach adopted by the present invention, although resembling a loop externally, is not actually a loop, and the effective length of traction may be selected depending on the circumstances. The present invention proposes a segment 3 of variable length, said segment 3 possibly being a loop of variable length, which is not familiar in the prior art, for example from application WO0156855A1.

The device supplied via batteries/accumulators 8 (LIFEPO4 for example) and is capable of displacement by means of wheels or caterpillar tracks and is easily stowed in the trunk of a vehicle. The caterpillar tracks or wheels may be operated by an auxiliary motor and a wired or wireless drive, which allows the device to move around independently depending on its weight or the place where it is to be used (for example for the transport of loads on an inclined plane). The invention makes it possible to dispense with a shoreline (the simple winch entails having an unobstructed shoreline in order to be able to unwind the rope) and does not require a fixed installation (because the rope tensions are low). The invention may be freely programmable (speeds, tensions, reaction times, etc.), thereby allowing different uses than water sports. It is adaptable for the transport of objects (removals) or persons (rescue) and also for other sports and other applications.

Programming of the drive for the motors makes it possible, by linking the two motors together, to inter-regulate them in order to obtain the desired behavior and to maintain the necessary characteristics (tension, speed of traction, etc.).

Figure 3:
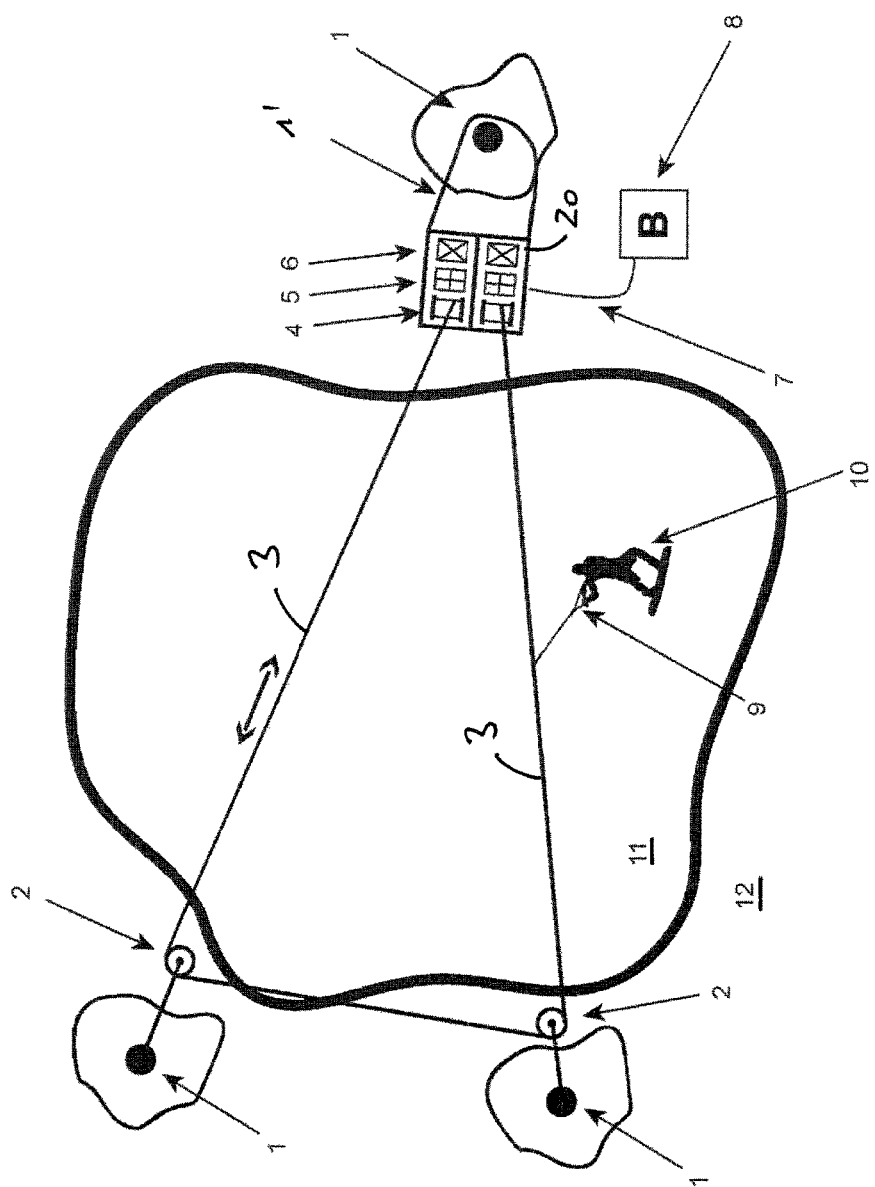
FIG. 3 is an illustration of a third mode of implementation of the present invention.
Figure 4:
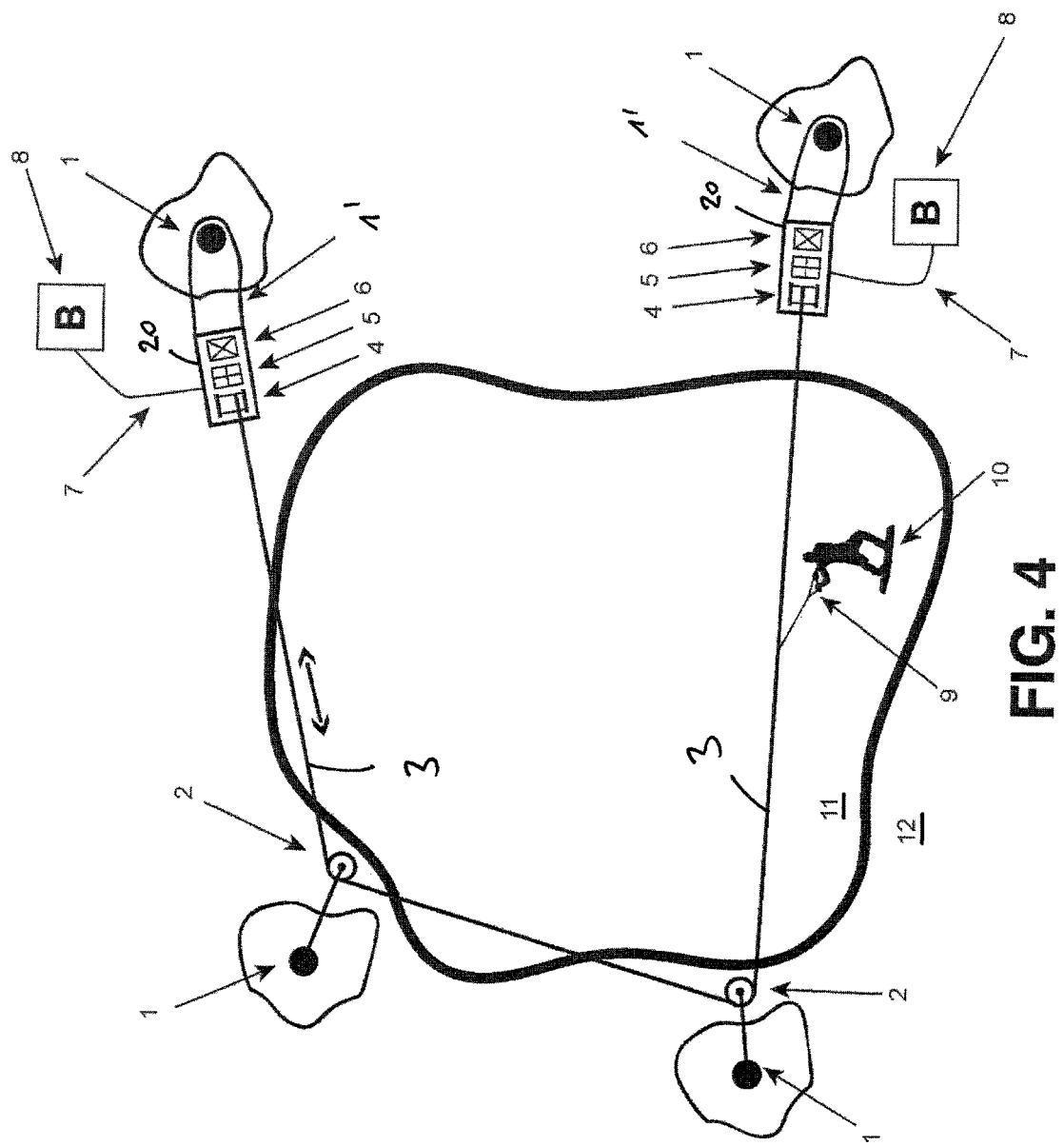
FIG. 4 is an illustration of a fourth mode of implementation of the present invention.

According to another mode of implementation, it is possible to use one or a plurality of changeover pulleys 2, rather than return pulleys, in order to be able to obtain an "elbow" or "bend" along the segment 3. These modes of implementation are illustrated in FIGS. 3 and 4 and the principles described above in relation to the other modes of implementation apply in a corresponding manner. In this mode, the device has one or two motors 5 if they are situated at the same location (see FIG. 3) or has two motors 5 if each winch is present at the end of the segment 3 (see FIG. 4). Common or separate supplies 7, 8 are proposed for the motors, depending on the circumstances, or also the utilization of an energy supply that is present on the site.

Figure 5:
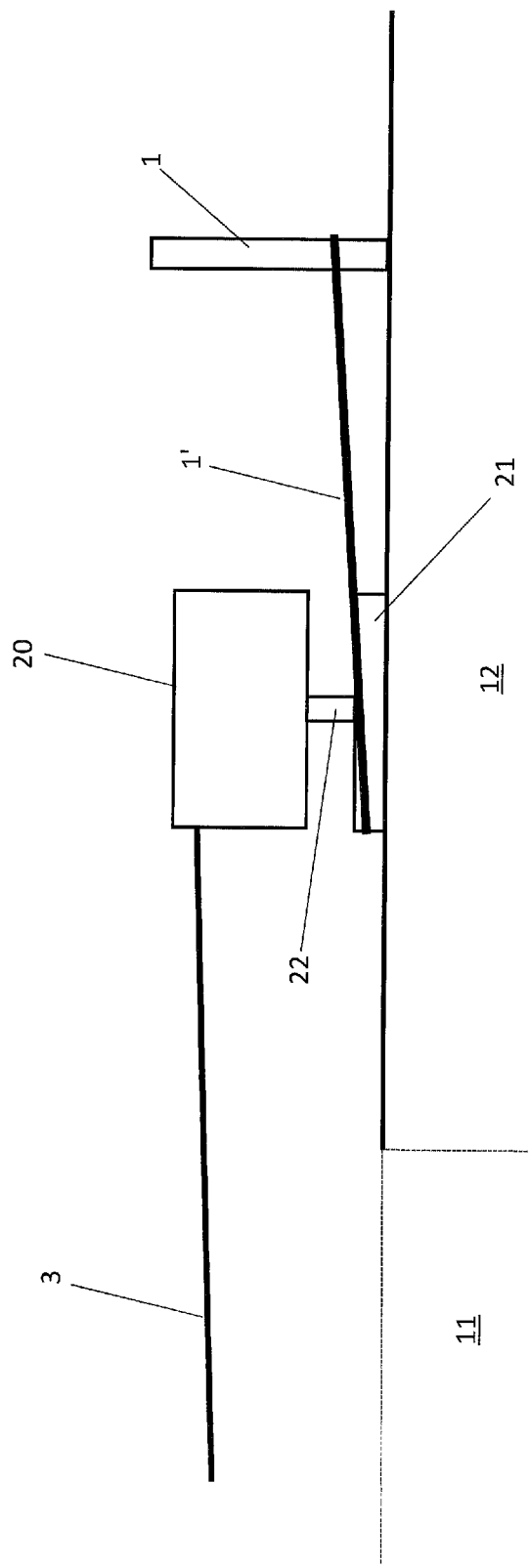
FIG. 5 illustrates schematically a side view of a possible embodiment of the frame bearing the driving means according to the invention.

FIG. 5 illustrates a schematic manner an embodiment of the transportable frame, having the designation 20. As described above, the frame 20 comprises in particular the spools 4, the one or more motors 5 and the drive (controller or the inverter) 6. As illustrated in FIGS. 1 to 4, the frame 20 may be lashed directly to the fixed point 1, or, as illustrated in FIG. 5, the frame may be mounted on a base 21. In such a case, the base 21 is itself lashed to the fixed point 1, for example by a strap 1', and the frame 20 is mounted on the base 21 by means of a support 22. The support 22 is preferably a rotary support permitting the frame 20 to be caused to rotate in relation to the base 21 about a vertical axis passing through the support 22. This permits the frame to be oriented in relation to segment 3.

The degree of freedom in rotation is provided, for example, by a bearing which may be located either in the base 21 or in the frame 20. It is possible to leave the rotation of the frame 20 relative to the base 21 free, or to provide locking means which are implemented, for example, once the frame 20 has been adjusted as intended.

This mode of implementation with an adjustable frame may be applied to all the modes of implementation of the invention, in particular those illustrated in FIGS. 1 to 4. When a configuration with two frames 20 is used (as in FIGS. 2 and 4, for example), the two frames 20, or one frame on its own, may be adjustable. The choice may be made, for example, depending on the circumstances.

The modes of implementation of the invention are given by way of example and should not be considered to be restrictive. Variations are possible within the scope of the claimed protection, in particular by resorting to equivalent means.

Numerous variants are possible, depending on the circumstances, on the configuration and on the proposed utilization of the system (water skiing, skiing, transport of loads, etc.).

As illustrated in the figures, configurations with or without pulleys are possible. The pulling means may be combined or separated. The latter may have their own source of energy or may utilize sources that are present on site (for example electrical).

The system according to the invention is easy to transport and may be installed practically anywhere. The fixed points may be means that are present on site or are positioned for this purpose (posts, vehicles etc.).

For the purpose of its transport, wheels may be provided on the frame 20 (or other equivalent means), and it may also comprise one or a plurality of handles, as well as dedicated spaces (such as drawers) for stowing the elements of the system (segment 3, pulley 2, straps 1', etc.)

The parts of the system may be made of any suitable material for the intended use: metal, synthetic material or mixtures of materials, etc.

LIST OF NUMERICAL REFERENCES

1: tree or point of attachment
1': strap
2: return pulley in FIG. 1 or changeover pulley in FIGS. 2/3/4
3: segment
4: winding spool
5: motor
6: inverter or controller
7: connection/power supply cable
8: power supply unit (here batteries)
9: handle and secondary rope
10: transported user or object
11: water
12: ground
20: frame
21: base
22: rotary support

The invention claimed is:

1. A winch system for water sports, the winch system comprising:
   a motor;
   a braking system, the motor and the braking system configured to be attached to a fixed point;
   two spools; and
   a traction cable dimensioned to cover a traction segment, the traction cable wound around the two spools,
   wherein each spool is configured to be actuated by at least one of the motor and the braking system so that when one of the spools unwinds the traction cable at one end of the traction cable and the other spool winds up the traction cable at the other end of the traction cable to maintain both an unwinding speed and a tension required for the traction cable such that the traction cable has a variable length for the traction segment, and
   wherein the traction cable does not form a loop, and one of the two spools is configured to be arranged remotely from the other one of the two spools.

2. The system as claimed in claim 1, wherein the braking system includes a motor.

3. The system as claimed in claim 1, wherein at least one of the motor and the braking system includes a drive having an inverter operating at least one the motor and the braking system.

4. The system as claimed in claim 3, comprising:
   a frame that includes the motor, at least one of the two spools, and the inverter.

5. The system as claimed in claim 4, wherein the frame is mounted to a base, the base being connected to the fixed point.

6. The system as claimed in claim 5, wherein the frame is mounted to the base with a rotary support configured to relatively rotate the frame with respect to the base.

7. The system as claimed in claim 1, wherein the motor is at least one of an electric motor and an internal combustion engine.

8. The system as claimed in claim 1, further comprising:
a rope attached to the traction cable, the rope including a handle that can be held by a user.

9. The system as claimed in claim 1, further comprising:
a control device.

10. The system as claimed in claim 9, wherein the control device is a remote control.

11. The system as claimed in claim 1, further comprising:
a return pulley that defines two segments along the traction cable.

12. The system as claimed in claim 1, further comprising:
a plurality of pulleys.

13. The system as claimed in claim 1, further comprising:
a rope attached to the traction cable, the rope including a handle; and
a control device,
wherein the control device is integrated with the handle.

14. The system as claimed in claim 1, further comprising:
a second motor,
wherein the motor is configured to control the traction cable to a constant speed, and the second motor is configured to control the traction cable to a constant tension.

15. The system as claimed in claim 1, wherein the braking system is embodied by the motor that performs regenerative braking.

16. A method for transporting persons or objects, the method performed by a system comprising,
a motor;
a braking system, the motor and the braking system attached to a fixed point;
two spools; and
a traction cable covering a traction segment, the traction cable wound around the two spools, the traction cable does not form a loop, and one of the two spools is configured to be arranged remotely from the other one of the two spools,
the method comprising the step of:
actuating at least one of the motor and the braking system to unwind the traction cable with one of the spools at one end of the traction cable, and to wind up the traction cable with the other spool at the other end of the traction cable, to maintain both an unwinding speed and a tension required for the traction cable in a such a manner that the traction cable has a variable length for the traction segment.

17. The method for transporting persons or objects according to claim 16, further comprising the step of:
pulling a water skier with the traction cable.

18. The method as claimed in claim 16, wherein the system includes a second motor, the method further comprising the step of:
maintaining the traction cable at a constant speed by the motor while controlling the traction cable to a constant tension by the second motor.

19. A winch system for water sports, the winch system comprising:
a motor;
a braking system, the motor and the braking system configured to be attached to a fixed point;
a plurality of pulleys;
two spools; and
a traction cable dimensioned to cover a traction segment, the traction cable wound around the two spools,
wherein each spool is configured to be actuated by at least one of the motor and the braking system so that when one of the spools unwinds the traction cable at one end of the traction cable and the other spool winds up the traction cable at the other end of the traction cable to maintain both an unwinding speed and a tension required for the traction cable such that the traction cable has a variable length for the traction segment.

* * * * *